United States Patent
Briere et al.

(10) Patent No.: US 6,374,111 B1
(45) Date of Patent: Apr. 16, 2002

(54) SYSTEM AND METHOD FOR ROBUST AUTOMATIC CELL RETUNE

(75) Inventors: Sylvain Briere, Laval (CA); Mark Murphy, Richardson, TX (US)

(73) Assignee: Telefonaktiebolaget LM Ericsson (publ) (SE)

( * ) Notice: Subject to any disclaimer, the term of this patent is extended or adjusted under 35 U.S.C. 154(b) by 0 days.

(21) Appl. No.: 09/267,512

(22) Filed: Mar. 12, 1999

(51) Int. Cl.$^7$ ................................................ H04Q 7/20
(52) U.S. Cl. .......................... 455/452; 455/62; 455/450
(58) Field of Search ............................... 455/452, 188.1, 455/450, 403, 575, 62, 446; 370/329, 333, 431

(56) References Cited

U.S. PATENT DOCUMENTS

| | | | | |
|---|---|---|---|---|
| 4,670,899 A | * | 6/1987 | Brody et al. | 379/60 |
| 4,723,266 A | * | 2/1988 | Perry | 379/60 |
| 5,434,798 A | | 7/1995 | Madebrink et al. | 364/514 |
| 5,487,101 A | * | 1/1996 | Fletcher | 379/60 |
| 5,513,379 A | * | 4/1996 | Benveniste | 455/33.1 |
| 5,809,423 A | * | 9/1998 | Benveniste | 455/452 |
| 5,822,686 A | * | 10/1998 | Lundberg et al. | 455/161.3 |
| 5,956,642 A | * | 9/1999 | Larsson et al. | 455/449 |
| 5,970,417 A | * | 10/1999 | Toyryla et al. | 455/519 |
| 6,021,123 A | * | 2/2000 | Mimura | 370/331 |
| 6,023,459 A | * | 2/2000 | Clark et al. | 370/329 |
| 6,061,568 A | * | 2/2000 | Dent | 455/550 |
| 6,049,717 A | * | 4/2000 | Dufour et al. | 455/451 |
| 6,112,092 A | * | 8/2000 | Benveniste | 455/450 |
| 6,154,655 A | * | 11/2000 | Borst et al. | 455/451 |
| 6,212,386 B1 | * | 4/2001 | Briere et al. | 455/447 |
| 6,275,497 B1 | * | 8/2001 | Varma et al. | 370/431 |

FOREIGN PATENT DOCUMENTS

| | | | | |
|---|---|---|---|---|
| CA | 2192248 | 6/1997 | | |
| EP | 0 446 080 | 1/1992 | | |
| JP | 07327254 A | * | 9/2000 | H04Q/7/28 |
| SE | WO 0056083 | * | 9/2000 | H04Q/7/00 |
| WO | WO 96/31075 | 10/1996 | | |
| WO | WO 96/35300 | 11/1996 | | |
| WO | WO 97/09833 | 3/1997 | | |
| WO | WO 97/41704 | 11/1997 | | |
| WO | WO 98/24258 | 6/1998 | | |
| WO | WO 98/51101 | 11/1998 | | |
| WO | WO 99/53705 | 10/1999 | | |

OTHER PUBLICATIONS

International Search Report, PCT/SE00/00400, dated Sep. 13, 2000.

I. Katzela and M. Naghshineh, "Channel Assignment Schemes for Cellular Mobile Telecommunication Systems: A Comprehensive Survey," *IEEE Personal Communications*, Jun. 1996, vol. 3, No. 3, pp. 10–31.

* cited by examiner

Primary Examiner—Thanh Cong Le
Assistant Examiner—Charles Chow
(74) Attorney, Agent, or Firm—Jenkins & Gilchrist

(57) ABSTRACT

A system and method are presented for optimally retuning channel equipment in a base station serving a cell from a first channel group to a second channel group, without dropping pending calls and maintaining channel separation throughout the retune above a predetermined threshold. A sequential order for retuning the channel equipment is determined which insures that every channel equipment is retuned to a channel that is separated from the operating channels of each other channel equipment in a cell by a certain threshold. After determining the appropriate order, the status of each channel equipment is checked to determine whether the channel equipment is busy or idle. Based on the status of each channel equipment, the channel equipment are simultaneously retuned in groups of the size equivalent to the number of idle channel equipment in the determined sequential order. A pending call on a busy channel equipment to be retuned is transferred to another channel equipment which is outside of the group to be retuned, using an intra-cell hand-off. The channel equipment are retuned iteratively in this manner until each channel equipment is retuned.

24 Claims, 3 Drawing Sheets

SYSTEM AND METHOD FOR ROBUST AUTOMATIC CELL RETUNE

BACKGROUND OF THE INVENTION

1. Technical Field of the Invention

The present invention relates to cellular telecommunications networks and, in particular, to retuning cells within telecommunications networks.

2. Description of Related Art

Reference is now made to FIG. 1 wherein there is illustrated an exemplary cell structure and frequency plan assignment for use in a radio frequency reuse cellular telephone system. An arbitrary geographic region (hereinafter "the service area") is divided into a plurality of contiguous cell sites 10 schematically represented by hexagons. Each of these cell sites 10 is sectorized to include three cells 11. The cell sites 10 are then grouped into clusters 12 (outlined in bold to ease recognition). For example, in the frequency plan of FIG. 1, each cluster 12 includes seven cell sites 10(1)–10(7). It will, of course, be understood that each cluster 12 may have more or less cell sites 10 as required by the selected frequency plan.

The available frequencies in the allocated hyperband are divided in accordance with the frequency plan into channel groups 14, with the channel groups assigned amongst the cells 11 of each cell site 10 in a cluster 12 such that the radio channels of the allocated hyperband are reused in each cluster. For example, in a plan having seven cell sites 10 per cluster 12 (and three cells 11 per cell site) like that shown in FIG. 1, there are twenty-one channel groups 14 identified and differentiated from each other by the alphanumeric labels "A1, A2, A3" through "G1, G2, G3" corresponding to the cells 11(1)a–11(7)c, respectively. Thus, each cell 11(1)a in the service area is assigned use of radio channels of the allocated hyperband in channel group A1, each cell 11(2)a is assigned use of radio channels of the allocated hyperband in channel group B1, and so on up to each cell 11(7)a being assigned use of radio channels of the allocated hyperband in channel group G1. Cells 11(1)b through 11(7)b are assigned the radio channels of the allocated hyperbands in channel groups A2 through G2, respectively, while cells 11(1)c through 11(7)c are assigned the radio channels of the allocated hyperbands in channel groups A3 through G3, respectively. An exemplary channel chart correlating three hundred thirty-three available individual analog radio channels to the channel groups 14 in the plan illustrated in FIG. 1 is shown in TABLE 1.

TABLE 1

| A1 | B1 | ... | A2 | B2 | ... | A3 | B3 | ... | G3 |
|---|---|---|---|---|---|---|---|---|---|
| 333 | 332 | | 326 | 325 | | 319 | 318 | | 313 |
| 312 | 311 | | 305 | 304 | | 298 | 297 | | 292 |
| 291 | 290 | | 284 | 283 | | 277 | 276 | | 271 |
| 270 | 269 | | 263 | 262 | | 256 | 255 | | 250 |
| 249 | 248 | | 242 | 241 | | 235 | 234 | | 229 |
| 228 | 227 | | 221 | 220 | | 214 | 213 | | 208 |
| 207 | 206 | | 200 | 199 | | 193 | 192 | | 187 |
| 186 | 185 | | 179 | 178 | | 172 | 171 | | 166 |
| 165 | 164 | | 158 | 157 | | 151 | 150 | | 145 |
| 144 | 143 | | 137 | 136 | | 130 | 129 | | 124 |
| 123 | 122 | | 116 | 115 | | 109 | 108 | | 103 |
| 102 | 101 | | 95 | 94 | | 88 | 87 | | 82 |
| 81 | 80 | | 74 | 73 | | 67 | 66 | | 61 |

TABLE 1-continued

| A1 | B1 | ... | A2 | B2 | ... | A3 | B3 | ... | G3 |
|---|---|---|---|---|---|---|---|---|---|
| 60 | 59 | | 53 | 52 | | 46 | 45 | | 40 |
| 39 | 38 | | 32 | 31 | | 25 | 24 | | 19 |
| 18 | 17 | | 11 | 10 | | 4 | 3 | | |

It will be noted that in such a frequency plan, adjacent cells 11 are typically not assigned use of the same channel group. Reuse of an identical channel group in the service area is preferably made with a separation of at least more than one cell site 10 along with a regulation of broadcast power from each cell to constrain radio propagation substantially within the cell area. Furthermore, it will be noted that typically no one cell 11 utilizes channels in the allocated hyperband that do not meet some minimal channel separation. Adjacent channel groups are preferably assigned no closer than one cell 11 away from each other. By arranging the cell sites 10 in clusters 12 and dividing cell sites into cells 11 as shown in FIG. 1, regulating broadcast power of communications within the cell as mentioned above, and further by assigning channels in the fashion mentioned above, the likelihood of interference is reduced while simultaneously providing effective cellular communications services across a very large service area.

Each of the cell sites 10 in a cellular telephone system such as that illustrated in FIG. 1 includes at least one base station (BS) 18 configured to facilitate radio channel communications with mobile stations 20 moving throughout the service area. The base stations 18 are illustrated as being positionally located at or near the center of each of the cell sites 10. However, depending on geography and other known factors, the base stations 18 may instead be located at or near the periphery of, or otherwise away from the centers of, each of the cell sites 10. Each base station 18 includes three directional antennas 19, wherein each of the directional antennas are pointed towards and serve a particular cell 11.

The base stations 18 are connected by communications links (generally shown by arrow 16) to at least one mobile switching center (MSC) 22 operating to control the operation of the system for providing cellular communications with the mobile stations 20. Operation of the mobile switching center 22 and base station 18 to provide cellular telephone service is well known to those skilled in the art, and will not be described.

Referring now to FIG. 2, an exemplary base station 18 configured in accordance with the present invention is described. Each base station 18 includes three directional antennas 19a, 19b, and 19c, each serving a particular cell 11. Each antenna is connected to a plurality of channel equipments (Tx/Rx) 24 each capable of operating independently on a different radio channel of the channel group 14 assigned to the cell 11 served by the antenna 19. In the present example, each channel equipment 24 connected to directional antenna 19a operates at a different radio channel of the A1 channel group as described in TABLE 2.

TABLE 2

| Tx/Rx | A1 Channel |
|---|---|
| 24 (1) | 333 |
| 24 (2) | 312 |
| 24 (3) | 291 |
| 24 (4) | 270 |
| 24 (5) | 249 |

TABLE 2-continued

| Tx/Rx  | A1 Channel |
|--------|-----------|
| 24 (6) | 228       |
| 24 (7) | 207       |
| 24 (8) | 186       |

The capacity or maximum number of users of a cell site 10 is dictated by the number of assigned channels. In order to accommodate the demand for a cellular telecommunications network, each cell site 10 is strategically placed and sized so that the demand within the cell site is commensurate with the capacity. Accordingly, in high traffic areas such as a metropolitan city, cell sites 10 are generally smaller in size, while in more rural areas, cell sites 10 are larger in size. After the cell sites 10 are strategically positioned and sized, channel assignments are made in accordance with a frequency reuse plan which minimizes co-channel interference.

However, over time the demand for cellular telecommunications services is subject to change. Increasing numbers of persons subscribing to cellular services as well as population growth in the geographic area of the cell site 10 can cause the demand for cellular telecommunications services to exceed the capacity of a cell site 10. To accommodate the additional demand, additional cell sites 10 are placed in the area and a larger number of smaller cell sites 10 accommodate the same area. The placement of additional cell sites 10 requires a reassignment of the channels for the cells 11 to minimize co-channel interference. The reassignment often requires preexisting cells 11 to be retuned in accordance with the channel reassignment. When the cell 11 is retuned to a new channel assignment, each channel equipment 24 connected to the directional antenna 19 serving the cell must be retuned to one of the new channels. The process of retuning a channel equipment 24 involves temporarily disabling the channel equipment and calibrating the channel equipment to a new channel.

A problem arises when a channel equipment 24 is retuned to a channel that is too close to a channel currently used by another channel equipment 24. For example, if the channel equipment 24 connected to the directional antenna 19a were to be retuned from the A1 channel group to the G3 channel group, each channel equipment would have to be retuned from a channel of the A1 channel group to a channel of the G3 channel group as shown in TABLE 3.

TABLE 3

| Tx/Rx  | A1 Channels | G3 Channels |
|--------|-------------|-------------|
| 24 (1) | 333         | 313         |
| 24 (2) | 312         | 292         |
| 24 (3) | 291         | 271         |
| 24 (4) | 270         | 250         |
| 24 (5) | 249         | 229         |
| 24 (6) | 228         | 208         |
| 24 (7) | 207         | 187         |
| 24 (8) | 186         | 166         |

In particular channel equipment 24(1) must be retuned from channel 333 to channel 313. However, channel equipment 24(2) operates at channel 312 pursuant to the A1 channel group. Therefore, if channel equipment 24(1) is retuned to channel 313 while channel equipment 24(2) is still operating at channel 312, the channel separation between the channel equipment 24(1) and channel equipment 24(2) would be too small and likely to introduce interference concerns. Furthermore, the power calibration on the retuned channel equipment 24(1) is affected and the channel equipment 24(1) may be wrongly tuned as a result.

Although simultaneously retuning each channel equipment 24 would prevent the aforementioned problem, a simultaneous retune of all channel equipment in a cell 11 would require temporarily disabling all the channel equipment. In this retune scenario, all currently pending calls within the cell 11 would be dropped. Therefore, it would be preferred if the retune could be implemented, at least to some extent, in serial fashion in order for all calls to be maintained, albeit the reduced capacity service provision within the cell 11.

SUMMARY OF THE INVENTION

The present invention is directed to a system and method for retuning channel equipment. The channel equipment are first sorted in an order for retune from first to last wherein the target channel for each channel equipment maintains a threshold channel separation from the current channels for the channel equipment that are sorted later in the order for retune. The channel equipment are then retuned in accordance with the sorted order.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION OF PREFERRED EMBODIMENTS

Figure 1:
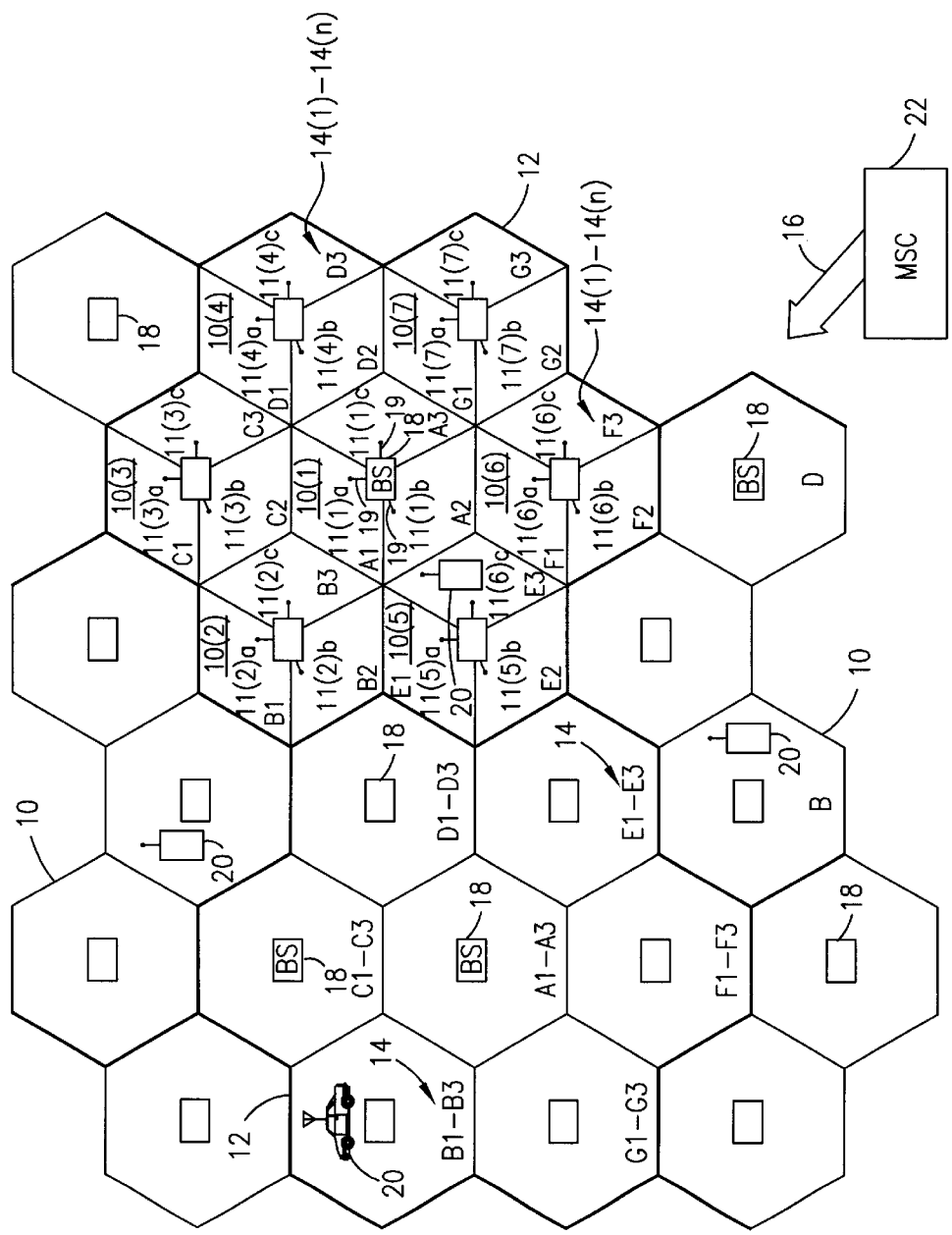
FIG. 1 is a block diagram of an exemplary cell structure wherein the present invention can be practiced.
Figure 2:
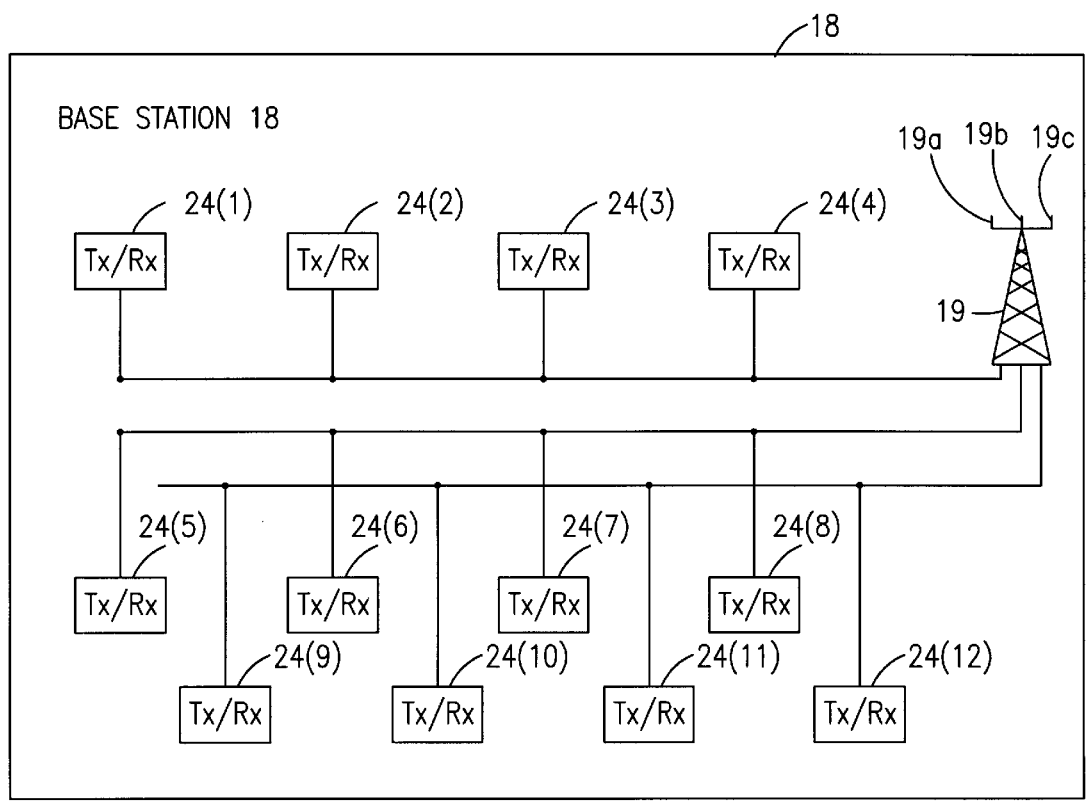
FIG. 2 is a block diagram of an exemplary base station configured in accordance with the present invention.

Continued reference is now made to FIGS. 1 and 2. The present invention proposes determining a sequential order for retuning the channel equipment 24 which ensures that every channel equipment is retuned to a target channel that is separated from the current channels of each other still unretuned channel equipment serving the cell 11 by a certain threshold determined to represent the minimum required channel separation for proper retuning. After determining the appropriate order, the status of each voice channel device is checked to determine whether the channel equipment 24 is busy (engaged in a pending phone call) or idle. Channel equipment is normally attached to one or more voice channel devices. A channel equipment 24 is said to be busy if it is attached to at least one busy voice channel device. Otherwise, the channel equipment is said to be idle. Based on the status of each voice channel device 24, the channel equipment 24 are simultaneously retuned in groups up to the size equivalent to the number of idle voice channel device 24 in the determined sequential order. If necessary, a pending call on a busy voice channel device attached to a channel equipment 24 to be retuned is transferred using what is known as an intra-cell hand-off to an idle voice channel device 24 (in the same cell 11 as the channel equipment being retuned) which attached to channel equipment which is outside of the group to be retuned. In the foregoing fashion, the time to retune the cell 11 while maintaining minimum channel separation between all of the channel equipment 24 and without dropping pending phone calls is minimized.

Figure 3:
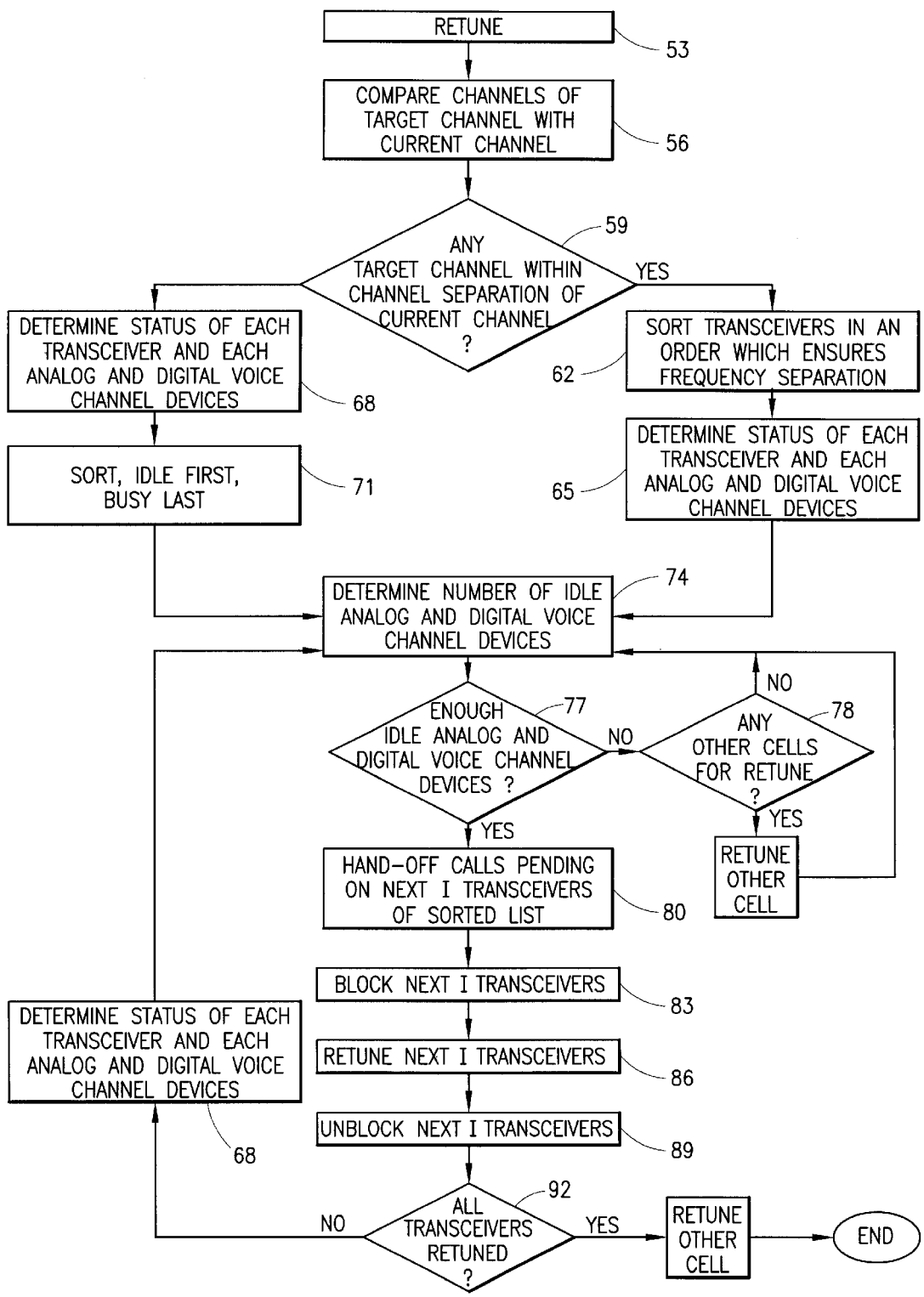
FIG. 3 is a flow diagram illustrating the operation of the base station in accordance with the present invention.

Referring now to FIG. 3, there is illustrated a flow diagram for a cell retune which minimizes the time to retune the cell 11 while maintaining a minimum threshold channel separation between all of the channel equipment 24 and maintaining pending phone calls. At step 53, a given cell 11 has been identified to be retuned from a set of current channels to a set of target channels. Each target channel is compared to each current channel (step 56), with the exception of the current channel this target channel is replacing, to determine if any target channel is within a certain threshold channel separation of any current channel (step 59). The threshold is an operator defined variable which represents the minimum channel separation (in number of channels) between channel equipment 24 required to allow for the channel equipment to be properly calibrated at retune. A default value of the threshold can be, for example, set at twelve channels.

Where a channel in the target channel group is within the threshold channel separation of a channel in the current channel group, again, with the exception of the current channel the target channel is replacing, a channel equipment 24 could potentially be retuned to a target channel which is too close to the current channel of another channel equipment 24, thereby potentially causing problems with calibration and tuning. To address these concerns the channel equipment 24 are sorted in a serial list in an order for later retune which ensures that whenever a channel equipment is retuned, the target channel for that channel equipment will have a channel separation with the current channel of all of the other channel equipment in the cell that still need to be retuned by at least the threshold (step 62). After sorting the channel equipment 24 in step 62, the status of each channel equipment (busy or idle) is determined (step 65).

Where no channel in the target channel group is within the threshold channel separation of a channel in the current channel group (with the exception of the current channel replace by a target channel), the threshold channel separation is maintained during the retuning process, regardless of the order in which the channel equipment 24 are retuned. The status of each channel equipment 24 is ascertained (step 68) and the channel equipment are sorted starting from the idle channel equipment 24 and ending with the busy channel equipment 24 (step 71). The reason for sorting the channel equipment 24 in this manner is to minimize the number of intra-cell hand-offs.

After the status of the channel equipment 24 is known and the channel equipment have been sorted (steps 62 or 71), the total number of idle analog voice channel devices and digital voice channel devices, j, is determined (step 74). At step 77, a determination is made whether enough idle analog voice channel devices and digital voice channel devices 24 exist to start performing the process of retuning the cell 11. The minimum number of idle analog voice channel devices and digital voice channel devices necessary to retune a cell should be user definable. For example, in order to retune the cell 11, at least one analog voice channel device and three digital voice channel devices may have to be idle. If the foregoing is not the case, the algorithm proceeds to any other cell that needs to be retuned (steps 78 and 79) and again checks the total number of idle analog voice channel devices and digital voice channel devices 24 (step 74) and determines if enough idle analog voice channel devices and digital voice channel devices exist (step 77).

Where the number of idle analog voice channel devices and digital voice channel devices 24 are sufficient (during step 77), the process of retuning the cell is started. The process of retuning the cell in the minimum amount of time, while maintaining minimum channel separation and without dropping pending phone calls is achieved by iteratively retuning each of the channel equipment 24 in the sorted order derived (during step 62 or step 71), up to i channel equipment per iteration, where i is the number of channel equipment corresponding to j voice channel devices and where i depends on the number of voice channel devices attached to the channel equipment to be retuned.

Because retuning a channel equipment 24 requires the channel equipment to be temporarily disabled, or blocked, a pending call on a channel device attached to channel equipment 24 to be retuned must be transferred to a channel device attached to a different channel equipment 24 via an intra-cell hand-off. Therefore during step 80, calls pending on any busy voice channel device attached to one of the next up to i channel equipment 24 in the sorted order are handed off to an idle voice channel device attached to another channel equipment 24. To reduce the number of intra-cell hand-offs, the idle channel equipment 24 to receive hand-offs are prioritized wherein idle channel equipment 24 which have already been retuned receive top priority for receiving hand-offs, followed by the remaining idle channel equipment 24 to be retuned in the reverse order of the sorted list (i.e., the channel equipment 24 that are sorted last in the order of retuning have higher priority for receiving an intra-cell handoff during retune).

After as many as possible pending calls corresponding to the next up to i channel equipment 24 in the sorted order are handed-off to channel devices attached to other channel equipment, these idle channel equipment are then blocked (step 83), retuned (step 86), and unblocked (step 89). The foregoing process (steps 80–89) retunes up to i channel equipment 24 in the sorted order. It is noted that i is the maximum number of channel equipment 24 that can be blocked, retuned, and unblocked during steps 80–89, without dropping pending calls. The status of each voice channel devices and each channel equipment 24 in the cell is then again determined (step 95), the value of j is updated (step 74) based on the latest status of the voice channel devices during step 95, and the process of steps 74–89 is repeated as necessary until each channel equipment of the cell is retuned (step 92). After each channel equipment 24 of the cell is retuned, the process is terminated.

The flow diagram of FIG. 3 is best understood by reference to a specific example, wherein a cell 11 with eight channel equipment, Tx/Rx1 . . . Tx/Rx8 using the A1 channel group is retuned to the channels of the G3 channel group, and it is identified that a channel separation of at least twelve channels is required to properly calibrate the channel equipment 24 and it is identified that at least one analog voice channel device or three digital voice channel devices must be idle to retune a cell. Retuning from the A1 channel group to the G3 channel group represents a worst case scenario, wherein channels of the G3 channel group are adjacent to the channels of the A1 group. An example of a retuning scenario is shown in TABLE 4. For simplification, in this example it is-assumed that all channel equipment is attached to only one voice channel device.

TABLE 4

| Tx/Rx | A1 Channels | G3 Channels | STATUS |
|---|---|---|---|
| 1 | 333 | 313 | Busy |
| 2 | 312 | 292 | Idle |
| 3 | 291 | 271 | Idle |

TABLE 4-continued

| Tx/Rx | A1 Channels | G3 Channels | STATUS |
|---|---|---|---|
| 4 | 270 | 250 | Busy |
| 5 | 249 | 229 | Busy |
| 6 | 228 | 208 | Idle |
| 7 | 207 | 187 | Busy |
| 8 | 186 | 166 | Busy |

At step 53, a particular cell has been identified to be retuned from the 8 channel numbers listed under the column A1 of TABLE 4 to the channel listed under column G3 of TABLE 4. In response, each target channel (of the G3 group) is compared to each current channel (of the A1 group) (step 56) with the exception of the current frequency that is replaced by the target frequency, to determine if any target channel does not maintain a 12 channel separation from one of the current channels with the exception stated above (step 59). In the present exemplary case, there are target channels which do not maintain a 12 channel separation from some current channels. For example, if Tx/Rx1 were to be retuned prior to Tx/Rx2, the channel separation would be only 1 channel. Therefore, to properly calibrate the channel equipment, the channel equipment must be sorted in an order which ensures that a channel separation of at least 12 channels will be maintained (step 62) amongst the channels used by the channel equipment of the cell at any time. The resulting order in the present exemplary case is shown in TABLE 5. After sorting the channel equipment, the status of each voice channel device and each channel equipment is obtained (step 65), and also shown in TABLE 5. At step 74, it is determined that three voice channel devices are idle, and that three voice channel devices are sufficient to retune the cell 10 (step 77).

TABLE 5

| ORDER | Tx/Rx | Current Ch | Target Ch | STATUS |
|---|---|---|---|---|
| 1st | 8 | 186 | 166 | Busy |
| 2nd | 7 | 207 | 187 | Busy |
| 3rd | 6 | 228 | 208 | Idle |
| 4th | 5 | 249 | 229 | Busy |
| 5th | 4 | 270 | 250 | Busy |
| 6th | 3 | 291 | 271 | Idle |
| 7th | 2 | 312 | 292 | Idle |
| 8th | 1 | 333 | 313 | Busy |

The process of retuning the cell 10 in the minimum amount of time, while maintaining channel separation of at least 12 channels and without dropping pending phone calls is achieved by iteratively retuning each of the channel equipment in the sorted order shown in TABLE 5, three channel equipment (i=j=3) per iteration.

Because retuning a channel equipment requires the channel equipment to be temporarily blocked, the pending calls on Tx/Rx8 and Tx/Rx7 must be transferred to different channel equipment via an intra-cell hand-off. Therefore during step 80, calls pending on Tx/Rx8 and Tx/Rx7 are handed off to idle channel equipment. To reduce the number of intra-cell hand-offs, the idle channel equipment to receive hand-offs are prioritized wherein idle channel equipment which have already been retuned receive top priority for receiving hand-offs, followed by the remaining idle channel equipment to be retuned in the reverse order of the sorted list. In the present exemplary case, no channel equipment have been retuned, therefore, Tx/Rx2 and Tx/Rx3 are selected to receive the calls pending on Tx/Rx8 and Tx/Rx7, as shown in TABLE 6. It is assumed that Tx/Rx2 and Tx/Rx3 are of appropriate type to receive the calls pending on Tx/Rx8 and Tx/Rx7. If the foregoing is not the case, other idle channel of appropriate type for handoffs from Tx/Rx8 and Tx/Rx7 would be selected.

TABLE 6

| ORDER | Tx/Rx | Current Ch | Target Ch | STATUS |
|---|---|---|---|---|
| 1st | 8 | 186 | 166 | Idle |
| 2nd | 7 | 207 | 187 | Idle |
| 3rd | 6 | 228 | 208 | Idle |
| 4th | 5 | 249 | 229 | Busy |
| 5th | 4 | 270 | 250 | Busy |
| 6th | 3 | 291 | 271 | Busy |
| 7th | 2 | 312 | 292 | Busy |
| 8th | 1 | 333 | 313 | Busy |

After the calls are handed-off to Tx/Rx2 and Tx/Rx3, the channel equipment, Tx/Rx8, Tx/Rx7, and Tx/Rx6 are blocked (step 83), retuned (step 86), (where the first channel equipment to be retuned is Tx/Rx8, the second is Tx/Rx7, and the third is Tx/Rx6) and unblocked (step 89). Because at step 92, not all of the channel equipment have been retuned, the status of each voice channel device and each channel equipment is determined (step 95), j is updated (step 74) (it is assumed that the number of idle voice channel devices and idle channel equipment, three, remain the same) and the next three channel equipment of the sorted list are to be retuned (steps 80–89). The status of each channel equipment in the sorted list is shown in TABLE 7.

TABLE 7

| ORDER | Tx/Rx | Current Ch | Target Ch | STATUS |
|---|---|---|---|---|
| 4th | 5 | 249 | 229 | Busy |
| 5th | 4 | 270 | 250 | Busy |
| 6th | 3 | 291 | 271 | Busy |
| 7th | 2 | 312 | 292 | Busy |
| 8th | 1 | 333 | 313 | Busy |
| 1st | 8 | 166 | — | Idle/Retuned |
| 2nd | 7 | 187 | — | Idle/Retuned |
| 3rd | 6 | 208 | — | Idle/Retuned |

At step 80, the calls pending on the next three channel equipment of the sorted list, Tx/Rx5, Tx/Rx4, and Tx/Rx3 are handed off to idle channel equipment of appropriate type. Because Tx/Rx8, Tx/Rx7, and Tx/Rx6 are idle retuned channel equipment, Tx/Rx8, Tx/Rx7, and Tx/Rx6 are selected to receive the calls pending on Tx/Rx3, Tx/Rx4, and Tx/Rx5 as shown in TABLE 8. Again, it is assumed that Tx/Rx8, Tx/Rx7 and Tx/Rx6 are of appropriate type to receive the calls pending on Tx/Rx3, Tx/Rx4 and Tx/Rx5.

TABLE 8

| ORDER | Tx/Rx | Current Ch | Target Ch | STATUS |
|---|---|---|---|---|
| 4th | 5 | 249 | 229 | Idle |
| 5th | 4 | 270 | 250 | Idle |
| 6th | 3 | 291 | 271 | Idle |
| 7th | 2 | 312 | 292 | Busy |
| 8th | 1 | 333 | 313 | Busy |
| 1st | 8 | 166 | — | Busy/Retuned |
| 2nd | 7 | 187 | — | Busy/Retuned |
| 3rd | 6 | 208 | — | Busy/Retuned |

After the calls are transferred, Tx/Rx3, Tx/Rx4, and Tx/Rx5 are blocked (step 83), retuned (step 86), (where the first channel equipment to be retuned is Tx/Rx5, the second is Tx/Rx4 and the third is Tx/Rx3) and unblocked (step 89). Because at step 92, not all of the channel equipment have been retuned, the remaining channel equipment of the sorted list, Tx/Rx1 and Tx/Rx2 are to be retuned (steps 80–89). The status of each voice channel device and each channel equipment is determined (step 95) and shown in TABLE 9.

TABLE 9

| ORDER | Tx/Rx | Current Ch | Target Ch | STATUS |
|-------|-------|------------|-----------|--------|
| 7th | 2 | 312 | 292 | Busy |
| 8th | 1 | 333 | 313 | Busy |
| 1st | 8 | 166 | — | Busy/Retuned |
| 2nd | 7 | 187 | — | Busy/Retuned |
| 3rd | 6 | 208 | — | Busy/Retuned |
| 4th | 5 | 229 | — | Idle/Retuned |
| 5th | 4 | 250 | — | Idle/Retuned |
| 6th | 3 | 271 | — | Idle/Retuned |

At step 80, the calls pending on Tx/Rx1 and Tx/Rx2 are handed off to two of the idle retuned channel equipment Tx/Rx5 and Tx/Rx4, as shown in TABLE 10, again assuming that Tx/Rx5 and Tx/Rx4 are of appropriate type to receive the calls pending on Tx/Rx1 and Tx/Rx2.

TABLE 10

| ORDER | Tx/Rx | Current Ch | Target Ch | STATUS |
|-------|-------|------------|-----------|--------|
| 7th | 2 | 312 | 292 | Idle |
| 8th | 1 | 333 | 313 | Idle |
| 1st | 8 | 166 | — | Busy/Retuned |
| 2nd | 7 | 187 | — | Busy/Retuned |
| 3rd | 6 | 208 | — | Busy/Retuned |
| 4th | 5 | 229 | — | Busy/Retuned |
| 5th | 4 | 250 | — | Busy/Retuned |
| 6th | 3 | 271 | — | Idle/Retuned |

After the calls are transferred, Tx/Rx1, and Tx/Rx2 are blocked (step 83), retuned (step 86) (where the first channel to be retuned is Tx/Rx2 and the second is Tx/Rx1), and unblocked (step 89) as shown in TABLE 11. At step 92, each channel equipment has been retuned, and the process of retuning this cell is completed.

TABLE 11

| ORDER | Tx/Rx | Current Ch | Target Ch | STATUS |
|-------|-------|------------|-----------|--------|
| 7th | 2 | 292 | — | Idle/Retuned |
| 8th | 1 | 313 | — | IdIe/Retuned |
| 1st | 8 | 166 | — | Busy/Retuned |
| 2nd | 7 | 187 | — | Busy/Retuned |
| 3rd | 6 | 208 | — | Busy/Retuned |
| 4th | 5 | 229 | — | Busy/Retuned |
| 5th | 4 | 250 | — | Busy/Retuned |
| 6th | 3 | 271 | — | Idle/Retuned |

Although the method and apparatus of the present invention has been illustrated in the accompanying Drawings and described in the foregoing Detailed Description, it will be understood that the invention is not limited to the embodiments) disclosed, but is capable of numerous rearrangements, modifications and substitutions without departing from the spirit of the invention as set forth and defined by the following claims.

What is claimed is:

1. In a telecommunications system comprising a plurality of channel equipment for a cell, each of said plurality of channel equipment operating at a current channel in a set of current channels, a method of retuning each one of said plurality of channel equipment in the cell to a target channel in a given set of target channels, said method comprising the steps of:

sorting said plurality of channel equipment into a sequential order for retune wherein each target channel in the set of target channels to which channel equipment is to be retuned is separated by a threshold channel distance from each one of the current channels in the set of current channels assigned to channel equipment yet to be retuned in said sequential order; and sequentially retuning each of said plurality of channel equipment in accordance with said sequential order.

2. The method of claim 1, further comprising, before the step of sequentially retuning, the steps of:

determining the busy/idle status of each of said plurality of channel equipment; and determining a number i of idle channel equipment in the cell.

3. The method of claim 2, wherein said step of sequentially retuning further comprises the steps of:

handing off calls pending on each busy channel equipment of a group of first i channel equipment in said sequential order; and retuning each channel equipment of the group of first i channel equipment.

4. The method of claim 3, wherein said step of sequentially retuning further comprises the steps of:

following the step of retuning each channel equipment of the group of first i channel equipment, 1) determining again the busy/idle status of each of said plurality of channel equipment; and 2) determining again the number i of idle channel equipment in the cell;

handing off calls pending on each busy channel equipment of a next group of i channel equipment in said sequential order; and retuning each channel equipment of the group of next i channel equipments.

5. The method of claim 2, wherein said step of determining the busy/idle status of each of said plurality of channel equipment comprises the step of:

determining a busy/idle status of each voice channel device of said each of said plurality of channel equipment and, if at least one voice channel device of one channel equipment is busy, determining that that one channel equipment has a busy status.

6. In a telecommunications system comprising a plurality of channel equipment, each of said plurality of channel equipment operating at a corresponding current channel of a set of current channels, a system for retuning each one of said plurality of channel equipment to a corresponding target channel of a given set of target channels, said system comprising:

means for sorting said plurality of channel equipment in a sequential order for retune wherein each target channel in the set of target channels to which a channel equipment is to be retuned is separated by a threshold channel distance from each one of the current channels in the set of current channels assigned to channel equipment yet to be retuned in said sequential order; and means for sequentially retuning each of said plurality of channel equipment in accordance with said sequential order.

7. The system of claim 6, further comprising:

means for determining the busy/idle status of each of said plurality of channel equipment; and means for determining a number i of idle channel equipment in the cell.

8. The system of claim 7, wherein said means for sequentially retuning further comprises:
   means for handing off calls pending on each busy channel equipment of a group of first i channel equipment; and
   means for retuning each channel equipment of the group of first i channel equipment.

9. The system of claim 8, wherein said means for sequentially retuning further comprises:
   means for determining again the busy/idle status of each of said plurality of channel equipment following the step of retuning each channel equipment of the group of first i channel equipment and for determining again the number i of idle channel equipment in the cell;
   means for handing off calls pending on each busy channel equipment of a next group of i channel equipment in said sequential order; and
   means for retuning each channel equipment of the next group of i channel equipment.

10. The system of claim 7, wherein said means for determining the busy/idle status of each of said plurality of channel equipment comprises:
    means for determining a busy/idle status of each voice channel device of each of said plurality of channel equipment and means for determining a channel equipment with a busy status if at least one voice channel device of that one channel equipment is busy.

11. The method of claim 3, wherein the step of handing off calls comprises the step of:
    a) handing off a call pending on each busy channel equipment of the group to an idle voice channel device of a channel equipment which is outside the group.

12. The method of claim 11, wherein the step a) of handing off calls comprises the step of:
    b) if an already retuned channel equipment is available, handing off a call pending on each busy channel equipment of the group to an idle voice channel device of that already retuned channel equipment.

13. The method of claim 1, wherein the step of sequentially retuning each of said plurality of channel equipment is performed by retuning at least one channel equipment per iteration.

14. The method of claim 1, wherein the step of sequentially retuning each of said plurality of channel equipment is performed by retuning a number i of channel equipment per iteration, wherein the number i is the maximum number of channel equipment that can be retuned during one iteration without dropping calls.

15. The method of claim 14, wherein the number i depends on the number of voice channel devices attached to the channel equipment to be retuned.

16. The method of claim 15, wherein the number i is the number of channel equipment corresponding to a number j of voice channel devices determined to be idle of said plurality of channel equipment.

17. The method of claim 16, further comprising, before the step of sequentially retuning, the steps of:
    determining the busy/idle status of each of voice channel device of each of said plurality of channel equipment;
    determining the number j of idle voice channel devices of said plurality of channel equipment; and
    determining a maximum number i of channel equipment to be retuned in one iteration.

18. The system of claim 8, wherein the means for handing off calls comprises a) means for handing off a call pending on a busy channel equipment of the group to an idle voice channel device of a channel equipment which is outside the group.

19. The system of claim 18, wherein the means a) for handing off calls comprises means for handing off a call pending on a busy channel equipment of the group to an idle voice channel device of that already retuned channel equipment, if an already retuned channel equipment is available.

20. The system of claim 6, wherein the means for sequentially retuning each of said plurality of channel equipment comprises means for retuning at least one channel equipment per iteration.

21. The system of claim 6, wherein the means for sequentially retuning each of said plurality of channel equipment comprises means for retuning a number i of channel equipment per iteration, wherein the number i is the maximum number of channel equipment that can be retuned during one iteration without dropping calls.

22. The system of claim 21, wherein the number i depends on the number of voice channel devices attached to the channel equipment to be retuned.

23. The system of claim 22, wherein the number i is the number of channel equipment corresponding to a number j of voice channel devices determined to be idle of said plurality of channel equipment.

24. The system of claim 23, further comprising:
    means for determining the busy/idle status of each of voice channel device of each of said plurality of channel equipment;
    means for determining the number j of idle voice channel devices of said plurality of channel equipment; and
    means for determining the maximum number i of channel equipment to be retuned in one iteration.

* * * * *